US011508013B2

(12) United States Patent
Andreae et al.

(10) Patent No.: US 11,508,013 B2
(45) Date of Patent: *Nov. 22, 2022

(54) SYSTEMS AND METHODS FOR PET INSURANCE UNDERWRITING, RATING, ADJUSTMENTS, AND ENROLLMENT

(71) Applicant: Adubb LLC, Punta Gorda, FL (US)

(72) Inventors: Alexander James Andreae, Punta Gorda, FL (US); Sebastian Milton Nonis, El Dorado Hills, CA (US); Megan Madalynne Rice, Punta Gorda, FL (US); Anthony C. Dubbaneh, Punta Gorda, FL (US)

(73) Assignee: ADubb LLC, Punta Gorda, FL (US)

( * ) Notice: Subject to any disclaimer, the term of this patent is extended or adjusted under 35 U.S.C. 154(b) by 184 days.

This patent is subject to a terminal disclaimer.

(21) Appl. No.: 17/002,194

(22) Filed: Aug. 25, 2020

(65) Prior Publication Data

US 2020/0387977 A1 Dec. 10, 2020

Related U.S. Application Data

(63) Continuation of application No. 15/760,618, filed as application No. PCT/US2016/052154 on Sep. 16, 2016, now Pat. No. 10,762,574.

(Continued)

(51) Int. Cl.
*G06Q 40/08* (2012.01)
*G06F 16/951* (2019.01)
(Continued)

(52) U.S. Cl.
CPC ........... *G06Q 40/08* (2013.01); *G06F 16/951* (2019.01); *G06Q 30/06* (2013.01); *H04W 4/029* (2018.02)

(58) Field of Classification Search
CPC ...... G06Q 40/08; G06Q 30/06; G06F 16/951; H04W 4/029; H04W 4/02
See application file for complete search history.

(56) References Cited

U.S. PATENT DOCUMENTS 7,246,070 B2 * 7/2007 Schwartz ............... G06Q 40/08
705/4
8,797,214 B2 * 8/2014 Taylor ................... G01S 5/0072
342/451

(Continued)

FOREIGN PATENT DOCUMENTS

WO 2004077937 A2 9/2004
WO 2006036316 A1 4/2006
(Continued)

OTHER PUBLICATIONS

Weiss, Tara: Safety net for pets, Dec. 10, 2005, The Journal News, pp. 1-2. (Year: 2005).*

(Continued)

*Primary Examiner* — Bijendra K Shrestha
(74) *Attorney, Agent, or Firm* — Aurora Consulting LLC; Kristen J. Hansen; Ashley Sloat (57) ABSTRACT

Systems and methods for pet insurance enrollment, adjustment, and utilization are provided herein. In some embodiments, one or more pet insurance offerings and a pet insurance enrollment process are available to a user through a mobile application on a mobile computing device. In some embodiments, a preliminary premium rate is calculated based on background information provided by a user through the mobile application. In some embodiments, a pet tracker forms a portion of the system, and an adjusted premium rate can be calculated based on pet monitoring data received directly or indirectly from the pet tracker. In some embodiments, pet monitoring data acquired from a plurality (Continued)

of pet trackers are used to develop, inform, and refine one or more pet insurance actuarial models.

20 Claims, 9 Drawing Sheets

Related U.S. Application Data (60) Provisional application No. 62/220,571, filed on Sep. 18, 2015.

(51) Int. Cl.
*H04W 4/029* (2018.01)
*G06Q 30/06* (2012.01)

(56) References Cited

U.S. PATENT DOCUMENTS

| | | | |
|---|---|---|---|
| 8,851,019 B2 * | 10/2014 | Jesurum | A01K 15/04 |
| | | | 119/721 |
| 9,772,612 B2 * | 9/2017 | McCarthy, III | G08B 25/008 |
| 2004/0034575 A1 * | 2/2004 | Oh | G06Q 30/0633 |
| | | | 705/26.61 |
| 2004/0176987 A1 * | 9/2004 | Dial | A01K 29/00 |
| | | | 705/4 |
| 2006/0285685 A1 | 12/2006 | Msezane | |
| 2010/0017234 A1 | 1/2010 | Stephens et al. | |
| 2013/0138526 A1 * | 5/2013 | Petruzzi | G06Q 30/0605 |
| | | | 705/26.2 |
| 2014/0163406 A1 * | 6/2014 | Roosenboom | A61B 5/0245 |
| | | | 600/509 |
| 2014/0278551 A1 | 9/2014 | Marshall et al. | |
| 2014/0278577 A1 * | 9/2014 | Baum | G06Q 40/08 |
| | | | 705/4 |
| 2014/0278582 A1 * | 9/2014 | Shambach | G06Q 40/08 |
| | | | 705/4 |
| 2014/0285339 A1 | 9/2014 | Thalheim | |
| 2014/0358592 A1 * | 12/2014 | Wedig | G06Q 40/08 |
| | | | 705/4 |
| 2015/0131479 A1 | 5/2015 | Fukui | |
| 2015/0196011 A1 | 7/2015 | So | |
| 2015/0334994 A1 * | 11/2015 | Prasad | A01K 11/008 |
| | | | 340/539.32 |
| 2018/0349852 A1 * | 12/2018 | Marshall, Dvm et al. | |
| | | | G06Q 40/08 |

FOREIGN PATENT DOCUMENTS

| | | | | |
|---|---|---|---|---|
| WO | | 2008097498 A1 | 8/2008 | |
| WO | WO-2017075207 A1 * | | 5/2017 | G06F 19/328 |

OTHER PUBLICATIONS

Patterson, Joan: Interest in pet insurance grows with advances in veterinary medical care, Feb. 21, 1999, Las Vegas Review, pp. 1-2 (Year: 1999).*
International Search Report dated Dec. 9, 2016 from International Application No. PCT/US2016/52154, 2 pgs.
Written Opinion dated Dec. 9, 2016 from International Application No. PCT/US2016/52154, 8 pgs.

* cited by examiner

SYSTEMS AND METHODS FOR PET INSURANCE UNDERWRITING, RATING, ADJUSTMENTS, AND ENROLLMENT

CROSS-REFERENCE TO RELATED APPLICATIONS

This application is a continuation of Ser. No. 15/760,618, filed Mar. 15, 2018; which is the U.S. National Stage Application under 35 U.S.C. 371 for PCT Application Serial No. PCT/US16/52154, filed Sep. 16, 2016; which claims the priority benefit under 35 U.S.C. § 119(e) of U.S. Provisional Patent Application No. 62/220,571, filed Sep. 18, 2015, the entirety of each of which is hereby incorporated by reference herein.

TECHNICAL FIELD

This disclosure relates to the field of pet insurance, and more specifically, to devices, systems, and methods for acquiring and processing data for use in pet insurance underwriting, rating, and adjustment processes, and also to devices, systems, and methods for offering, reviewing, and selecting pet insurance options.

BACKGROUND

Pet ownership in the United States has more than tripled since the 1970s with over 60% of U.S. households now including at least one pet. In general, Americans care deeply about their pets; over 80% of Americans view their pet as a member of the family. This increased popularity in and affection towards pets has resulted in increased spending on pets. More than $55 billion was spent on pets in the United States in 2013, and a 40% rise in veterinary costs has been observed in the last five years.

Keeping pets healthy and safe can be a challenge. For example, an owner's sedentary lifestyle may lead to a sedentary lifestyle for the owner's pets. Over 50% of dogs and cats in the United States are overweight or obese due to improper nutrition and/or lack of daily activity. As with humans, sedentary lifestyles and obesity in pets increases the risk of developing chronic conditions such heart disease, high blood pressure, Type II diabetes, and osteoarthritis. Additionally, certain pet breeds are prone to various genetic conditions and diseases.

In addition to preventing and treating chronic and acute illnesses, pet owners striving to keep their pets healthy and safe may have to devote considerable resources and attention to ensuring their pets do not wander away from home. Pets that wander away face serious risks; for example, such pets may be hit by a vehicle or permanently lost or stolen. In the United States, ten million pets are lost each year and fewer than ten percent ever return home.

Pet insurance is one of the best ways to reduce healthcare costs and keep pets safe, yet pet insurance is underutilized in the United States. Only 1.5% of U.S. pets are covered by insurance. Such underutilization may contribute to inflated health insurance prices. For example, many owners who self-select for pet insurance may be those with high risk pets, and such risks are currently spread across a relatively small population pool.

A limited amount of reliable data and a lack of advanced actuarial models may also contribute to inflated health insurance prices. Typically, insurance providers engage in insurance underwriting and rating processes in which they assess a risk level associated with the asset to be insured and determine an appropriate insurance policy price to protect against that risk. Human health insurance and auto insurance policy providers rely on highly refined actuarial models, based on tens of millions of insured bodies and reliable data from medical records, police reports, etc., to determine appropriate insurance premiums. In contrast, pet insurance premiums may be set without access to reliable data. Pet insurance policy providers often rely primarily on basic data provided by a pet owner, such as a pet's breed, age, sex, location of residence, general health, and preexisting conditions. Pet insurance providers often lack effective means to verify the accuracy of the owner-provided data. As a result, a pet's insurance rating may have a relatively high level of uncertainty. Insurance premiums may be inflated to protect the insurance provider from financial loss in light of this uncertainty.

Consequently, the relatively high cost of pet insurance deters many pet owners from obtaining insurance for their pets. Moreover, for those interested in pet insurance, the process of comparing quotes and enrolling in pet insurance can be cumbersome.

Accordingly, a need exists for improvements in the field of pet insurance.

SUMMARY

In particular, needs exist for improved data acquisition, data verification, actuarial models, and user experiences in the field of pet insurance. The present disclosure is directed to devices, systems, and methods that fill one or more of these needs.

One aspect of the disclosure is directed to a method of individualizing pet insurance premiums based on acquired pet monitoring data. In various embodiments, the method includes receiving pet monitoring data for a pet from at least one sensor on a pet monitoring device. The pet monitoring data may include, for example, a detected location, activity level, extreme temperature event, or impact event. The method further includes transmitting pet monitoring information to an insurer computing device. The pet monitoring information of various embodiments includes all or a portion of the pet monitoring data. For example, the pet monitoring information may include a stream of all collected pet monitoring data, a stream of one or more parameters of interest, an aggregation of pet monitoring data collected in a given timeframe, an aggregation of pet monitoring data collected from a population of pets, or plots, averages, or other metrics calculated from aggregate data. The method further includes receiving an adjusted premium rate for the pet from the insurer computing device. The adjusted premium rate of various embodiments is determined by the insurer computing device by adjusting a preliminary premium rate based on the pet monitoring information.

In some embodiments, the method also includes: first receiving background data about the pet from a user via a user input, transmitting the background data to the insurer computing device such that the insurer can calculate the preliminary premium rate based on the background data, and presenting an insurance offering that includes the preliminary premium rate to the user for purchase via a user interface.

In some such embodiments, transmitting the background data to the insurer computing device includes transmitting the background data to a plurality of insurer computing devices. In such embodiments, the method further includes: receiving an insurance quote from each of the plurality of insurer computing devices, and selecting the best quote and corresponding preliminary premium rate to present to the user. In some such embodiments, the method also includes negotiating, with an insurer, the best quote on the user's behalf. The best quote may be the lowest quote and/or a quote that best matches the insurance preferences of the user.

In some embodiments, background data about the pet includes at least one of an age, sex, breed, place of residence, proportion of time spent outdoors, vaccine record, neuter record, microchip record, preexisting health condition, other medical history, or owner insurance preference. In some embodiments, the background data about the pet is manually entered by a user through a graphical user interface on a personal computing device. In some embodiments, the background data about the pet is automatically pulled from a web-based medical record or an image of a physical medical record. In some embodiments, the pet monitoring data received from the sensor is used to verify and supplement the background data received from the user.

Additionally or alternatively, the method of some embodiments further includes: transmitting the pet monitoring information and the background data to an alternative insurer; receiving an alternative quote from the alternative insurer based, at least in part, on the pet monitoring information and the background data; comparing the adjusted insurance rate and the alternative quote to determine which insurance package is better for the user; and transferring the user's insurance coverage to the alternative insurer if the alternative quote is better for the user than the adjusted insurance rate.

In some embodiments of the method, the detected location is received from a GPS tracker. In some embodiments, the activity level is received from at least one of a gyroscope or an accelerometer. In some embodiments, the extreme temperature event data is received from a thermistor or other temperature-responsive sensor. In some embodiments, the impact event data is received from an accelerometer. In some embodiments, the pet monitoring data further includes a repetitive motion of the pet, which may be detected, for example, by an accelerometer. In some such embodiments, the repetitive motion is selected from a group consisting of: breathing, heart beating, and scratching.

In some embodiments, the method further includes building an actuarial model based on the pet monitoring data.

In some embodiments, the method is repeated periodically to update the adjusted premium rate based on recently acquired pet monitoring data.

In some embodiments, the method is performed by a server or a computing device connected via a wired or wireless communication connection to the server.

An additional aspect of the disclosure is directed to another method of individualizing pet insurance premiums based on acquired pet monitoring data. The disclosed method may be performed, for example, by a server functioning as both a pet management application server and an insurance server. Such a server may be managed or overseen by an insurance provider. In various embodiments, the method includes: receiving background data about a pet from a user via a user input; calculating a preliminary premium rate based on the background data; presenting an insurance offering, which includes the preliminary premium rate, to the user for purchase via a user interface; receiving a selection from the user to purchase an insurance plan associated with the insurance offering; enrolling the user in the insurance plan; receiving pet monitoring data for the pet from at least one sensor on a pet monitoring device; and adjusting the preliminary premium rate based on the pet monitoring data. In some such embodiments, the pet monitoring data includes at least one of a: detected location, activity level, extreme temperature event, impact event, and repetitive motion.

Another aspect of the disclosure is directed to a system configured to perform one or more of: providing, enrolling a user in, and adjusting, a pet insurance offering. In various embodiments, the system includes a wireless pet monitoring device, a mobile computing device, a pet management application server, and optionally, an insurer computing device.

In various embodiments, the wireless pet monitoring device has one or more sensors. The one or more sensors are configured to detect pet monitoring data, including at least one of a: current location, activity level, extreme temperature event, impact event, and a repetitive motion.

In some embodiments, the pet monitoring device is configured to transmit the detected pet monitoring data to a mobile computing device for further transmission to the application server. In other embodiments, the pet monitoring device is configured to transmit the detected pet monitoring data directly to the server.

In some embodiments, the mobile computing device is configured to receive user inputs indicative of background data about a pet and transmit the background data to the server. The mobile computing device may additionally be configured to receive the detected pet monitoring data from the pet monitoring device and transmit the pet monitoring data to the server. Additionally, the mobile computing device may be configured to receive information about insurance offerings, including a preliminary premium rate and an adjusted premium rate, from the server and display the information about insurance offerings to the user via a user output device. The mobile computing device may be configured to receive a user's selection of an insurance offering and transmit the selection to the server.

In some embodiments, the pet management application server is configured to receive the background data, calculate a preliminary premium rate based on the background data, receive the detected pet monitoring data, adjust the preliminary premium rate based on the detected pet monitoring data, and transmit the adjusted preliminary premium rate to the mobile computing device. In some embodiments, the server is configured to develop, refine, or apply an actuarial model based on the pet monitoring data.

In other embodiments, the server is configured to receive the background data from the mobile computing device and transmit the background data to the insurer computing device for calculating a preliminary premium rate. The server of some such embodiments is further configured to: receive pet monitoring data from the pet monitoring device or the mobile computing device; transmit pet monitoring information, including at least a portion of the pet monitoring data, to the insurer computing device; and receive an adjusted premium rate from the insurer computing device, the adjusted premium rate having been determined by the insurer computing device by adjusting the preliminary premium rate based on the pet monitoring information. The server may further transmit the adjusted premium rate to the mobile computing device and transmit a user-selected insurance offering to the insurer computing device.

BRIEF DESCRIPTION OF THE DRAWINGS

The foregoing is a summary, and thus, necessarily limited in detail. The above-mentioned aspects, as well as other aspects, features, and advantages of the present technology will now be described in connection with various embodiments, with reference made to the following accompanying drawings.

The illustrated embodiments are merely examples and are not intended to limit the invention.

DETAILED DESCRIPTION

The following description is not intended to limit the invention to these described embodiments, but rather to enable any person skilled in the art to make and use this invention. Other embodiments may be utilized and modifications may be made without departing from the spirit or the scope of the subject matter presented herein. Aspects of the disclosure, as described and illustrated herein, can be arranged, combined, and designed in a variety of different configurations, all of which are explicitly contemplated and form part of this disclosure.

Throughout and within this specification, one or more publications may be referenced to more fully describe the state of the art. The disclosures of each of these references are incorporated herein by reference in their entireties as though they also form part of this disclosure.

Unless otherwise defined, each technical or scientific term used herein has the same meaning as commonly understood by one of ordinary skill in the art to which this disclosure belongs.

As used in the description and claims, the singular form "a", "an" and "the" include both singular and plural references unless the context clearly dictates otherwise. For example, the term "an insurance provider" may include, and is contemplated to include, a plurality of insurance providers. At times, the claims and disclosure may include terms such as "a plurality," "one or more," or "at least one;" however, the absence of such terms is not intended to mean, and should not be interpreted to mean, that a plurality is not conceived.

The term "about" or "approximately," when used before a numerical designation or range (e.g., to define a distance), indicates approximations which may vary, for example, by (+) or (−) 5%. All numerical ranges provided herein are inclusive of the stated start and end numbers. The term "substantially" indicates mostly (i.e., greater than 50%) or essentially all of a substance, component, or device.

As used herein, the term "comprising" or "comprises" is intended to mean that the devices, systems, and methods include the recited elements, and may additionally include any other elements. "Consisting essentially of" shall mean that the devices, systems, and methods include the recited elements and exclude other elements of essential significance to the combination for the stated purpose. Thus, a system or method consisting essentially of the elements as defined herein would not exclude other materials, features, or steps that do not materially affect the basic and novel characteristic(s) of the claimed invention. "Consisting of" shall mean that the devices, systems, and methods include the recited elements and exclude anything more than a trivial or inconsequential element or step. Embodiments defined by each of these transitional terms are within the scope of this disclosure.

Disclosed herein are devices, systems, and methods for offering, calculating, reviewing, adjusting, selecting, supporting, and utilizing pet insurance. Various disclosed embodiments improve data acquisition, data verification, actuarial models, and user experiences in the field of pet insurance. In some embodiments, one or more pet insurance offerings and a pet insurance enrollment process are available to a user through a mobile application on a mobile computing device. In some embodiments, the entire pet insurance user experience occurs on the mobile computing device through the mobile application. Such a mobile application is described in more detail herein.

In some embodiments, a preliminary premium rate is calculated based on background information provided by a user through the mobile application. In some embodiments, a pet tracker additionally forms a portion of the system. In some such embodiments, pet monitoring data acquired from one or more pet trackers are used to develop, inform, and refine one or more pet insurance actuarial models. The pet insurance actuarial models are then used, along with a particular pet's pet monitoring data, to calculate an adjusted premium rate, which is adjusted to better match the pet's risk profile.

Figure 1:
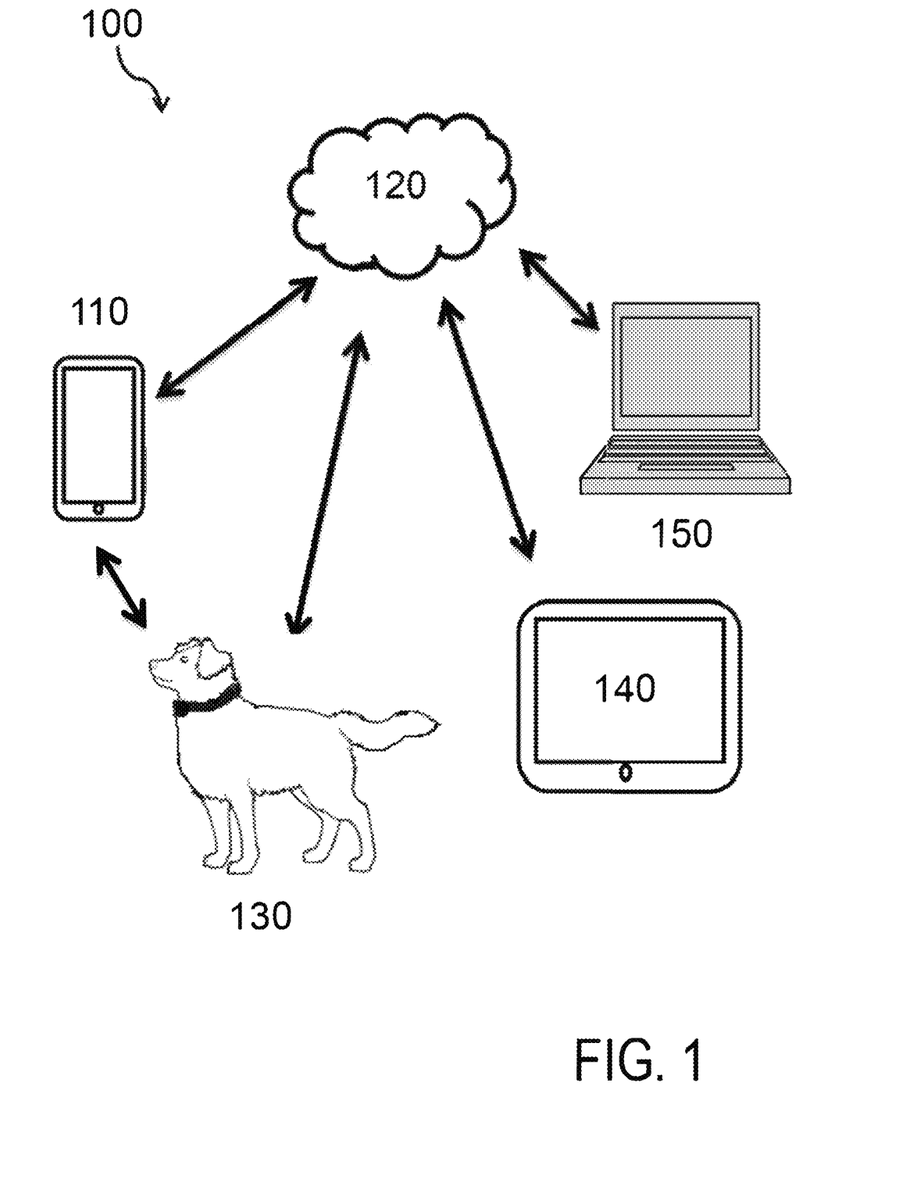
FIG. 1 illustrates a schematic block diagram of one embodiment of a system for pet insurance enrollment, adjustment, and utilization.

FIG. 1 illustrates one example of a pet management system, which may be used for pet insurance enrollment, adjustment, and utilization. As illustrated, in some embodiments, such a system 100 includes a mobile computing device 110 operated by a user referred to herein as a pet owner. The "pet owner" referred to herein may be any individual responsible for caring for and/or insuring a pet. The system further includes a cloud-based server 120. The system 100 may additionally include a pet monitoring device, also referred to herein as a pet tracker 130. In some embodiments, the system also includes one or more additional user computing devices 140 operated by other community members to whom the pet owner is connected. The other community members may include, but are not limited to, one or more of a veterinarian, dog walker, pet sitter, neighbor, family, or friend of the pet owner. In some embodiments, the system 100 also includes an insurer computing device 150. The insurer computing device 150 may be operated, managed, controlled, maintained, or owned by an insurance provider.

As shown, in various embodiments, at least the pet owner's mobile computing device 110 is coupled to the server 120 via a bidirectional communication link. In particular, the mobile computing device 110 may be connected to the server 120 via a CDMA, GSM, LTE, or other cellular network, via Wi-Fi®, or via any other suitable wireless communication protocol. In various embodiments, if a community member computing device 140 or insurer computing device 150 is present in the system, such devices are also connected to the server 120 via a bidirectional communication link, such as a cellular network, Wi-Fi, or other wireless communication protocol. In some embodiments, the pet tracker 130, if present, is similarly connected to the server 120 via a wireless communication protocol. Additionally or alternatively, in some embodiments, the pet tracker 130 is wirelessly connected to the pet owner's mobile computing device 110. The pet tracker 130 may be connected to the mobile computing device 110 via a nearfield communications (NFC) protocol, a low energy Bluetooth® protocol, or other radiofrequency (RF) communication protocol. In some such embodiments, the pet tracker 130 is wirelessly connectable to both the mobile computing device 110 and the server 120. In other embodiments, the pet tracker 130 is connectable only to the mobile computing device 110, with the mobile computing device 110 acting as an intermediary, relaying data between the pet tracker 130 and the server 120. In some embodiments, communication between the pet tracker 130 and the server 120 or mobile computing device 110 is bidirectional; in other embodiments, communication is unidirectional with data pushed from the pet tracker 130 to one or both of the server 120 and the mobile computing device 110.

In some embodiments, the mobile computing device 110 is a smartphone, wearable computing device, notebook computer, laptop computer, tablet, or other portable computing device. The cloud-based server 120 of some embodiments is an application server, an internet server, a database server, or a combination thereof. In some embodiments, the server 120 includes a connected computing device, input device, and/or output device, through which a system administrator can interact with, and adjust, the instructions and data stored within the server. In some embodiments, the pet tracker 130 is a portable, wearable device having at least one sensor stored thereon. The pet tracker 130 is configured to acquire data pertaining to the activity or environment of a pet. The additional user computing devices 140 and insurer computing device 150 may each be formed of any suitable computing device, such as a portable computing device or desktop computer, and the computing devices 140, 150 may be communicatively coupled to the server 120 through wired or wireless connections, configured to access information from the server via the internet or a mobile interface.

Figure 2:
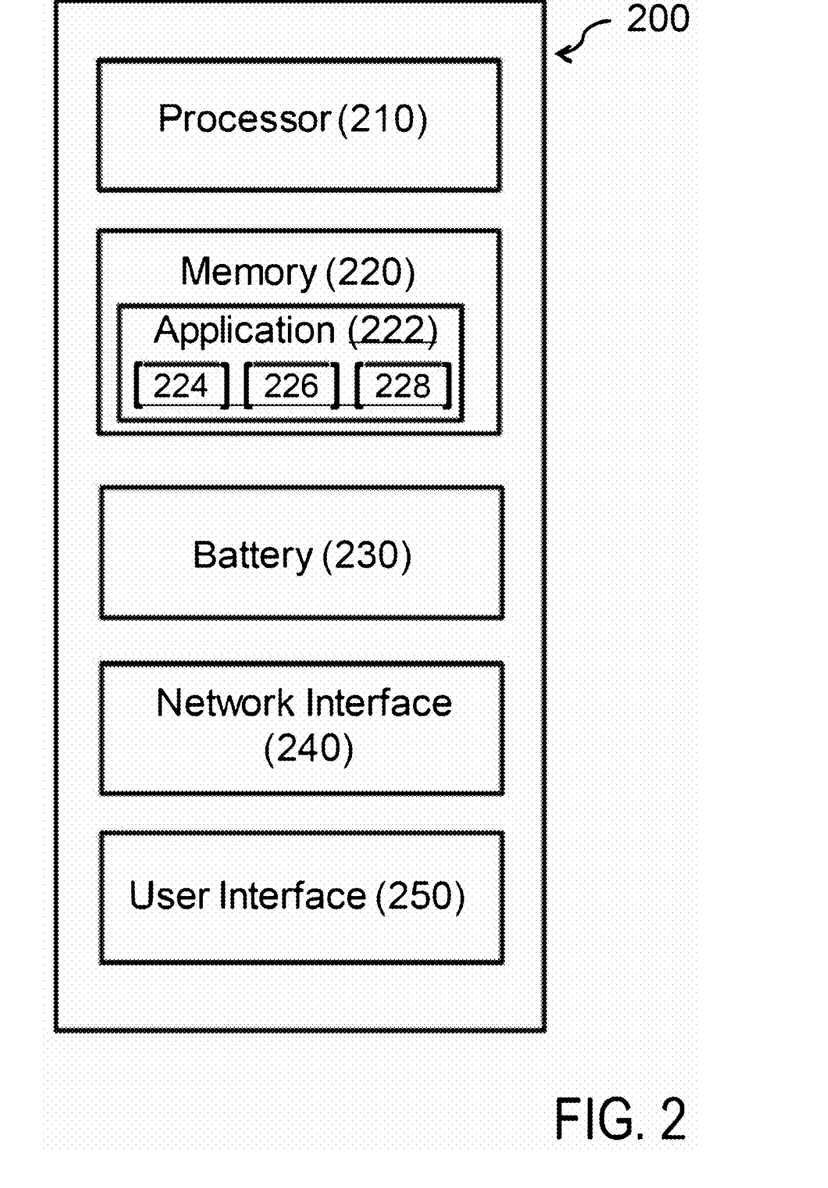
FIG. 2 illustrates a functional block diagram of one embodiment of a mobile computing device forming a portion of the system of FIG. 1.

A functional block diagram of one embodiment of a pet owner's mobile computing device 200 is provided in FIG. 2. While numbered uniquely, one skilled in the art will appreciate that the mobile computing device 110 of the system 100 may be formed of any embodiment of a mobile computing device described herein and may include any of or all the functional components described with respect to the mobile computing device 200 of FIG. 2. Moreover, although illustrated separately, it is to be appreciated that the various functional blocks of the mobile computing device 200 need not be separate structural elements.

The mobile computing device 200 of various embodiments includes a processor 210, for example, a general purpose microprocessor. In various embodiments, the processor 210 is coupled, via one or more buses, to the memory 220 in order to read information from and write information to the memory 220. The memory 220 may be any suitable computer-readable medium that stores computer-readable instructions for execution by computer-executable components. In various embodiments, the computer-readable instructions include software stored in a non-transitory format, some such software having been downloaded as an application 222 onto the memory 220 of the mobile computing device 200. The processor 210, in conjunction with the software stored in the memory 220, executes an operating system and the application 222. Some methods described elsewhere herein may be programmed as software instructions contained within the application 222 stored in the memory 220 and executable by the processor 210.

In various embodiments, a power supply, such as a battery 230 is included within the mobile computing device 200 and is electrically coupled to provide power to the processor 210 and other electronic components. The battery 230 may be rechargeable or disposable.

The mobile computing device 200 of various embodiments includes a plurality of interfaces, such as a wireless network interface 240 and a user interface 250. The wireless network interface 240 of some embodiments includes a receiver and transmitter for bi-directional communication. The receiver receives and demodulates data received over a communication network. The transmitter prepares data according to one or more network standards and transmits data over a communication network. In some embodiments, a communication antenna in the form of a transceiver acts as both a receiver and a transmitter. The user interface 250 may include one or more input/output (I/O) devices. In some embodiments, the user input device includes one or more of a button, switch, touchscreen, and keyboard, and the output device includes one or more of a display screen, light display, audio output, and haptic output.

In various embodiments of systems and methods provided herein, a pet management application 222 is downloaded onto the mobile computing device 200 by a pet owner. The pet management application 222 includes one or more of a records management module 224, an insurance module 226, and a tracking module 228.

Figure 3:
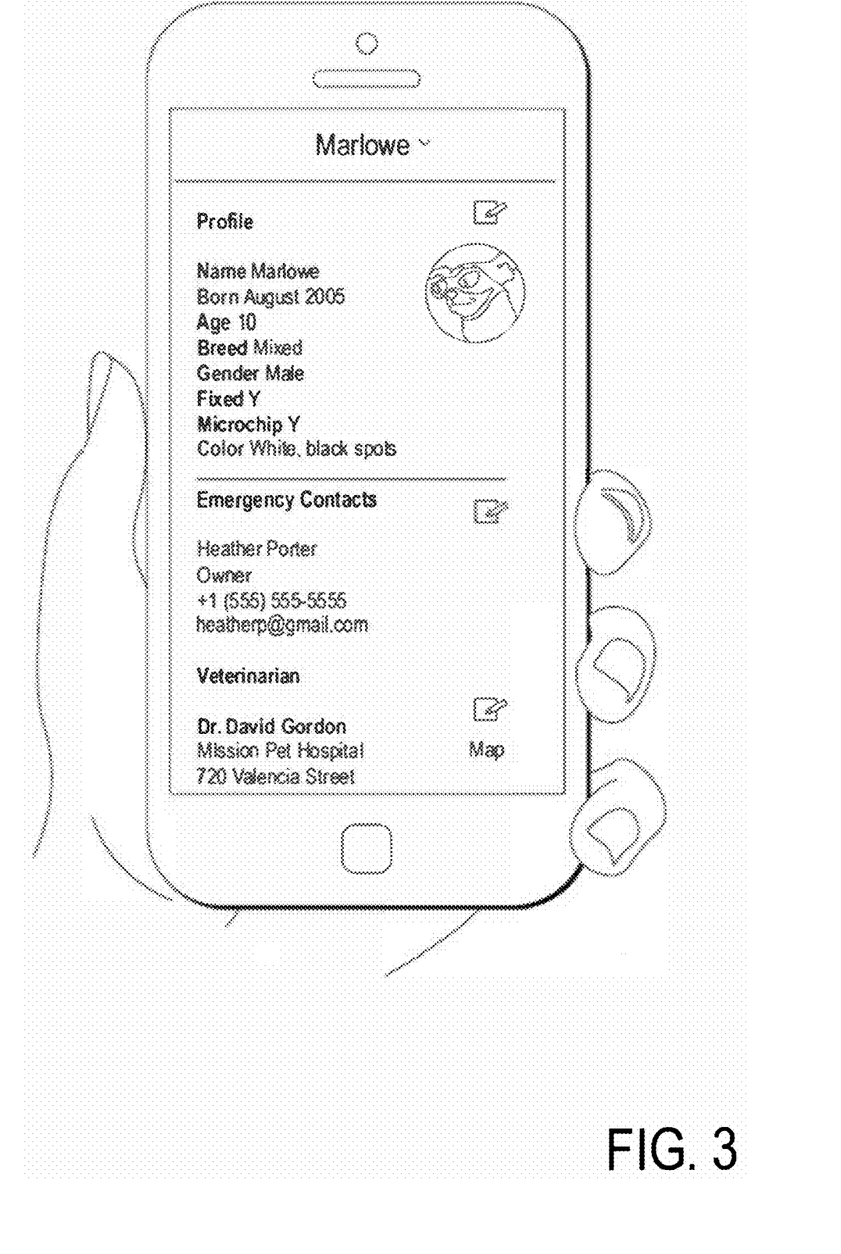
FIG. 3 illustrates one embodiment of a graphical user interface provided on a mobile computing device in one embodiment of the system.

The records management module 224 may be used by a pet owner to manage a pet's immunization record, other veterinary records, veterinary bills, pet photographs, and other documents. The pet management application 222 of various embodiments includes a graphical user interface displayable on a touchscreen, and by using an input device and the graphical user interface, the pet owner can enter pet background data. Background data may include the pet's name, address, age, birthdate, sex, species, breed, health conditions, allergies, dietary restrictions, a spay/neuter status (i.e., a fixed status), a microchip status, a proportion of time spent outdoors, immunization record, emergency contact information, a veterinarian's contact information, date of last veterinary visit, and other data related to the pet. In some embodiments, the background information is entered manually (e.g., by typing it). In other embodiments, the background information may be pulled from another application or website where such information is already stored or pulled from one or more imported documents, as described below. One embodiment of a user interface for receiving and displaying such background data is provided in FIG. 3. The graphical user interface of the pet management application 222 may further be configured to receive, store, and display tracked historical data such as a pet's food intake, exercise routine, and sleep schedule. The graphical user interface may additionally or alternatively be configured to display a calendar or record of future events such as a pet's planned pet walker schedule, pet sitter schedule, pet daycare schedule, veterinary appointments, scheduled playdates, or other appointments associated with pet ownership. Some of the user-entered information is saved in short-term or long-term storage on the mobile computing device 200, and at least some of the information is transmitted wirelessly via the communication antenna to the server 120 for storage in one or more databases.

In some embodiments, the records management module 224 may additionally or alternatively include a photograph storage option. In some such embodiments, an option to photograph a pet is available for selection within the user interface. When selected, a user may take and store photographs onto the mobile computing device 200 using camera functionality built into the mobile computing device. The user may also be able to access other photographs stored on the mobile computing device 200 and create electronic photo albums for the user's pet. The photographs and electronic photo albums may be stored in memory on the mobile computing device 200 or transmitted to the server 120.

The photograph storage option may additionally or alternatively enable a pet owner to import veterinary bills, records, or other physical pet-related documentation into the pet management application 222 for storage. In such embodiments, a user may select an option to import documentation via a photograph and be prompted to photograph the documentation of interest. In some embodiments, the photograph is stored as an image file on the mobile computing device 200 or on the connected server 120. In some embodiments, the photograph is converted into machine-encoded text using optical character recognition to improve data storage and retrieval. In some such embodiments, the system is configured such that background data about the pet can be identified in an imported document, copied, and added to a database of stored background data.

In various embodiments, the photographs, electronic photo albums, background data, and other information entered into the pet management application 222 using the records management module 224 may be shareable with other users. In some embodiments, a pet owner can select which information to share and with whom. Information may be shareable directly through the application 222 with other community members accessing the information on their additional user computing devices 140. In some embodiments, information is shareable by emailing or texting to another user or exporting to another application. In this way, a pet owner may be able to share information of interest with a family member, pet sitter, veterinarian, or other interested individual. In some embodiments, if a pet goes missing, a pet owner can select to generate a community alert which shares some of the pet information with community members on computing devices 140 in or near the vicinity in which the pet was last seen or detected.

As stated above, the pet management application 222 of some embodiments also includes an insurance module 226. The insurance module 226 enables a pet owner to explore pet insurance options, sign up for pet insurance, receive personalized premium rates, and submit claims to an insurance provider. In some such embodiments, the graphical user interface of the mobile computing device 200 may be configured to display one or more questions, during the application downloading and initializing process which the pet owner must answer to complete setup of the pet management application. For example, the user may be prompted to enter background data about the pet, such as any of the background data listed above. Additionally, the pet owner may be prompted to answer questions tailored to understanding what the pet owner desires or needs in a pet insurance plan. The questions may include questions about the pet owner's income or financial status, preferred deductible amounts, preferred co-pays, etc. Questions may be tailored to determine what items an owner wishes to pay for out of pocket and what items an owner expects to have covered by insurance. For example, questions may probe whether a pet owner: wishes to pay for preventative health visits, only desires catastrophic coverage, desires insurance that covers accidents and injuries, is comfortable with an insurance having a maximum coverage limit, etc. Some of or all the background data and insurance preferences entered by a pet owner through the user interface are transmitted to the server 120, and optionally, to an insurer computing device 150. The background data is then used to identify one or more suitable insurance offerings and a preliminary premium rate.

In some embodiments, the pet management application 222 is configured to display a plurality of insurance plan offerings to a pet owner and is further configured to receive a selection of one of the insurance plans from the pet owner. In other embodiments, a server-side component is configured to curate the insurance offerings based on the background data and insurance preferences and present to the pet owner one option, or less than all available options, which best match the pet owner's needs and preferences.

In some embodiments having an insurance module, upon user selection of a pet insurance offering, the graphical user interface displays an option to complete the insurance application and enrollment process through the mobile computing device 200. In such embodiments, text windows or other prompts are displayed through which a user can enter all personal and financial information needed for the application and enrollment process. In some embodiments, the completed insurance contract is presented to the pet owner through the application for review and signature. In some such embodiments, the graphical user interface is configured such that the user can electronically sign within the mobile application. In other embodiments, the pet owner is provided with a selectable link from within the application or in a system-generated text or email message. In such embodiments, selecting the link directs the pet owner to a site, such as DocuSign®, through which the pet owner can sign the insurance contract electronically. In other embodiments, the contract is presented to the user in a printable format, which the user can print, sign, and mail to complete the enrollment process.

In some embodiments, the graphical user interface of the pet management application 222 is configured to provide the pet owner with the option to enroll in auto-pay, enabling payment to occur seamlessly. In some embodiments, if a pet owner does not enroll in auto-pay, the pet management application 222 is configured to generate periodic notifications for the pet owner to authorize payment or submit payment of the owed premium amount.

In various embodiments having an insurance module 226, the pet management application 222 is configured to enable a pet owner to share documentation with the insurance provider. For example, in some embodiments, veterinary bills imported into the mobile application by the pet owner via a photograph may be submitted to the insurance provider as an insurance claim.

As stated above, the pet management application 222 of some embodiments includes a tracking module 228. The tracking module 228 of some embodiments is used in conjunction with a wireless pet tracker 130 to collect, process, and/or display recorded data pertaining to a pet's environment and/or activities.

Figure 4:
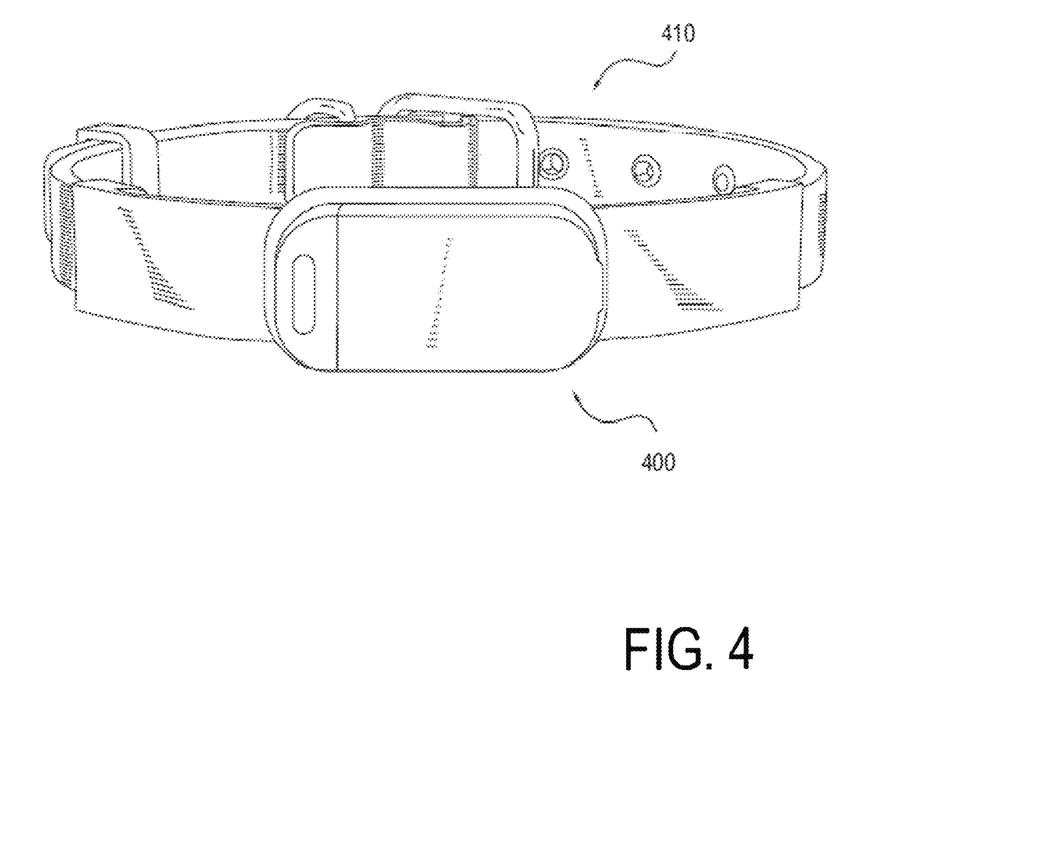
FIG. 4 illustrates a perspective view of one embodiment of a pet collar having a pet tracker.

One embodiment of a pet tracker 400 for use in conjunction with the pet tracking module 228 is provided in FIG. 4. In some embodiments, the pet tracker 400 is a device having one or more sensors, which is worn by a pet. In some embodiments, the pet tracker may be worn on a vest or around a leg of a pet. In other embodiments, the pet tracker 400 is worn on a collar 410 around the neck of the pet. As shown in the illustrated embodiment, the pet tracker 400 may be configured to attach to a standard or proprietary pet collar 410. In other embodiments, the pet tracker 400 may be a collar with one or more sensors integrated therein.

Figure 5:
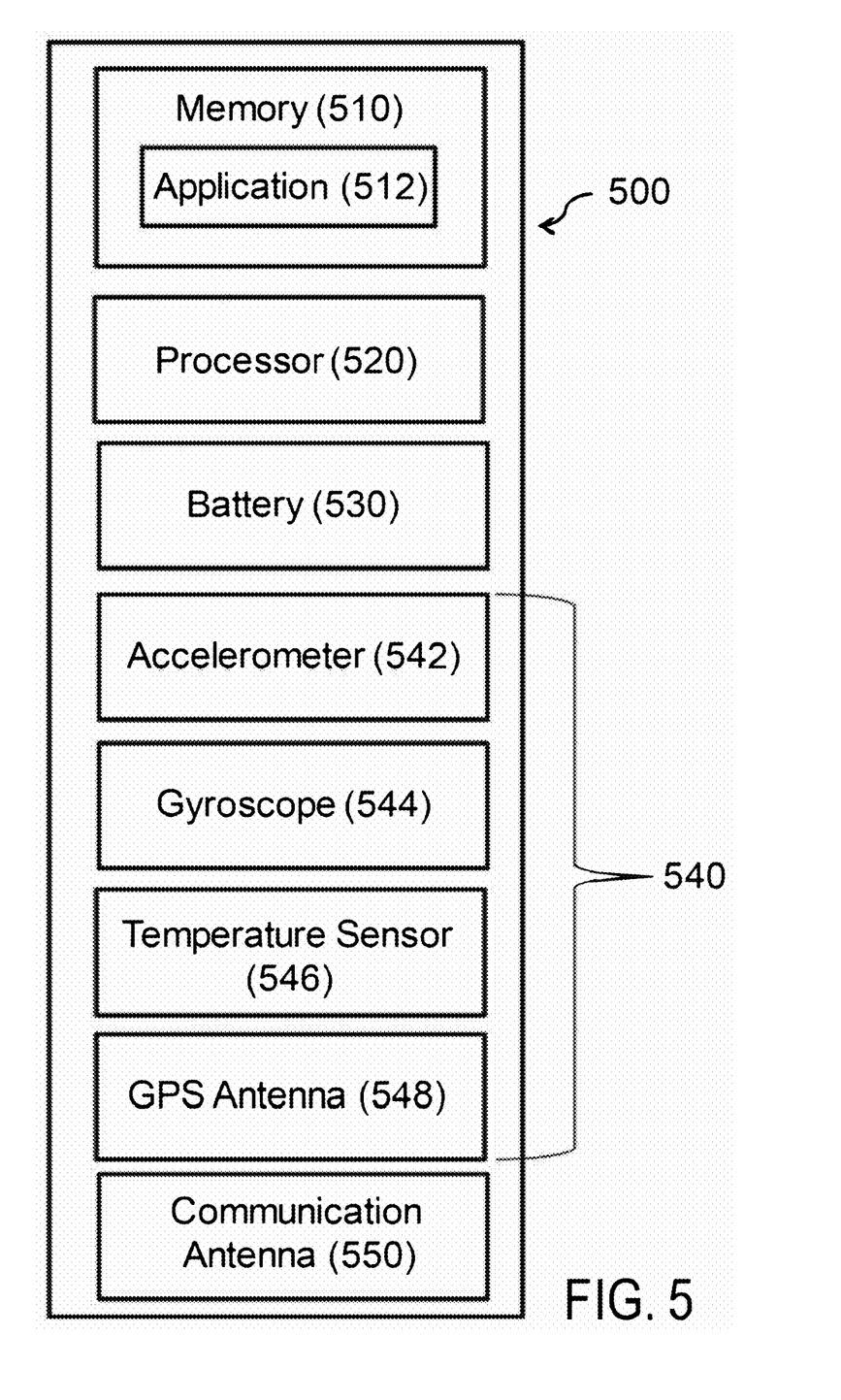
FIG. 5 illustrates a functional block diagram of one embodiment of a pet tracker forming a portion of the system of FIG. 1.

A functional block diagram of one embodiment of a pet tracker is provided in FIG. 5. While numbered uniquely, one skilled in the art will appreciate that the pet tracker 130 of FIG. 1 may be formed of any embodiment of a pet tracker described herein and may include any of or all the functional components described with respect to the pet tracker 500 of FIG. 5. Moreover, although illustrated separately, it is to be appreciated that the various functional blocks of the pet tracker 500 need not be separate structural elements.

The pet tracker 500 of various embodiments includes a processor 520, which may be a general purpose microprocessor, a digital signal processor (DSP), a field programmable gate array (FPGA), an application specific integrated circuit (ASIC), or other programmable logic device, or other discrete computer-executable components designed to perform the functions described herein. The processor 520 may also be formed of a combination of computing devices, for example, a DSP and a microprocessor, a plurality of microprocessors, one or more microprocessors in conjunction with a DSP core, or any other suitable configuration.

In various embodiments, the processor 520 is coupled, via one or more buses, to the memory 510 in order to read information from and write information to the memory 510. The processor 520 may additionally or alternatively contain memory 510. The memory 510 can include, for example, processor cache. The memory 510 may be any suitable computer-readable medium that stores computer-readable instructions for execution by computer-executable components. For example, the computer-readable instructions may be stored on one or a combination of RAM, ROM, flash memory, EEPROM, hard disk drive, solid state drive, or any other suitable device. In various embodiments, the computer-readable instructions include application software 512 stored in a non-transitory format. The software, when executed by the processor, causes the processor to perform one or more operations described elsewhere herein.

In various embodiments, a power supply, such as a battery 530, is electrically coupled to provide power to the processor 520 and other electronic components. The battery 530 may be rechargeable or disposable. Additionally, some embodiments of the pet tracker 500 may include one or more signal processing components, such as a filter (e.g., low pass, high pass, or band pass filter), an amplifier, and an analog-to-digital (AD) converter.

As shown, the pet tracker 500 of some embodiments includes one or more sensors 540 configured to detect signals indicative of a pet's environment or activity. For example, in some embodiments, the pet tracker includes one or more of: an accelerometer 542, a gyroscope 544, a thermistor or other temperature-responsive sensor 546, and a GPS antenna 548. In some embodiments, the pet tracker 500 is configured to detect one or more of: a relative activity level of the pet, scratching, breathing, a heart beating, other repetitive motion of a pet, a sudden impact, and an extreme temperature or extreme change in temperature, and a pet's location. In various embodiments, such pet monitoring data is transmitted from the pet tracker 500 to either the mobile computing device or the server, for example, via a communication antenna 550. The pet monitoring data may then be processed by the mobile computing device or the server to generate useful information for a pet owner. In various embodiments, the graphical user interface of the pet management application on the mobile computing device is configured to display various views of the useful information.

Figure 6:
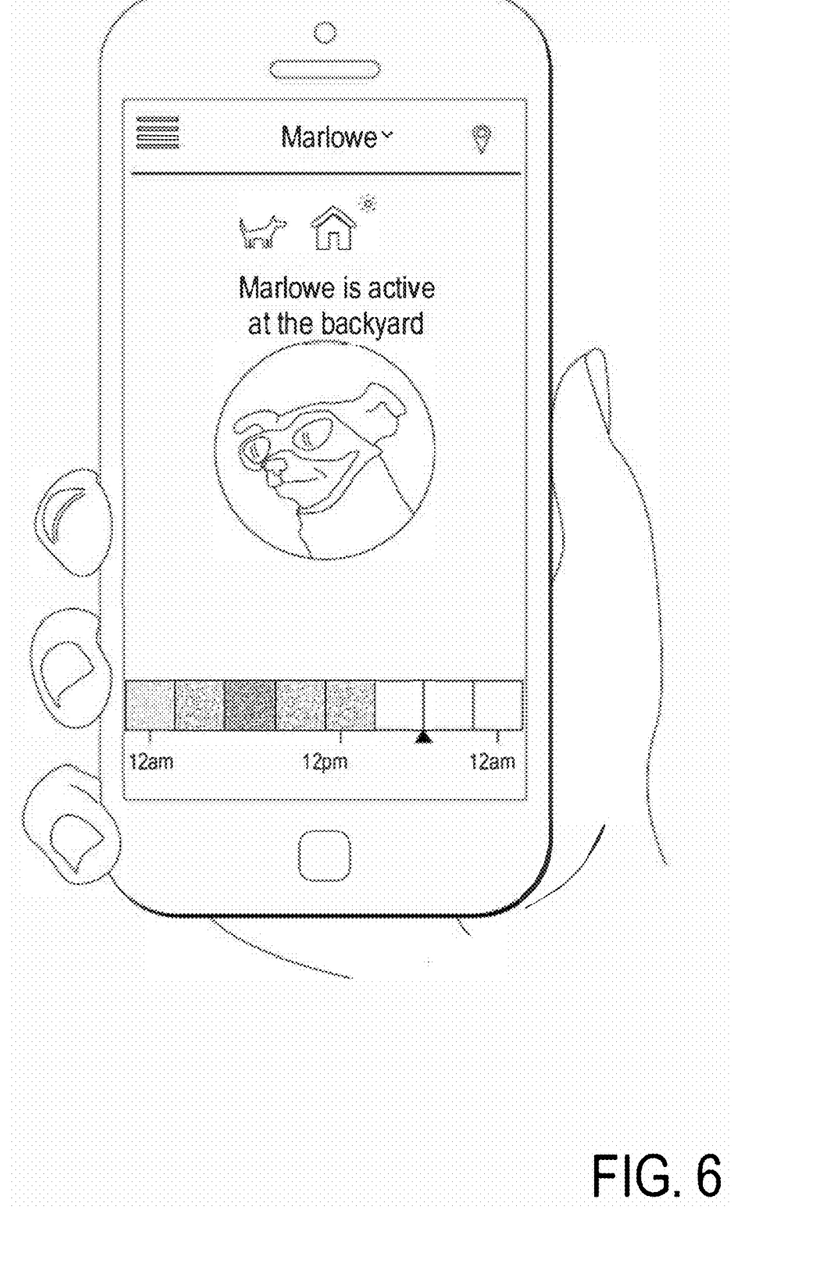
FIG. 6 illustrates one embodiment of a graphical user interface provided on a mobile computing device in one embodiment of the system.

As one non-limiting example, in some embodiments, the pet tracker includes a gyroscope 544 and/or an accelerometer 542 configured to detect changes in position, orientation, or acceleration. Changes in position, orientation, or acceleration may be used by the pet management application or server to detect if a pet is, at any point in time: highly active (e.g., running, swimming, or walking quickly), moderately active (e.g., walking around at a normal to slow pace, for example, within the pet's home), or not active (e.g., sleeping, sitting, or lying around). One embodiment of a user interface displaying relative activity data is shown in FIG. 6. Detected changes in acceleration may further be correlated to, and be used to detect, repetitive motions. In some embodiments, the accelerometer 542 is sensitive enough to detect subtle micro-movements caused by a beating heart or breathing and may be used to monitor vital signs. In other embodiments, a heart rate monitor or pulse monitor may be present in the device. In some embodiments, rapid and/or frequent changes in acceleration and/or orientation in a pet's movements, particularly when unaccompanied by forward progress, are correlated to, and used to detect, excessive and repetitive scratching. Such scratching may be indicative of fleas, ticks, a skin condition, or anxiety. Additionally or alternatively, in some embodiments, accelerometer signals are monitored for severe changes in acceleration indicative of an impact event. For example, in some embodiments, the mobile computing device or server is configured to detect and alert a pet owner, an insurer, or other party when an impact event, such as a large fall (e.g., out of a tree) or being hit by a vehicle, has occurred.

In some embodiments, the pet tracker 500 includes a thermometer, a thermistor, or other temperature-responsive sensor 546, which is configured to detect temperature or changes in temperature. Temperature or changes in temperature may be correlated to, and used to detect, extreme temperature events. In particular, if a rapid rise in temperature is detected or a dangerous temperature threshold is crossed, the graphical user interface of the mobile computing device may be configured to generate an alert notifying a pet owner that the pet may be in an unattended car or other space where unsafe conditions have been detected. In some embodiments, the temperature-responsive sensor 546 is configured for use in determining if a pet has been left outdoors in conditions that are dangerously cold or dangerously hot for a pet.

Figure 7:
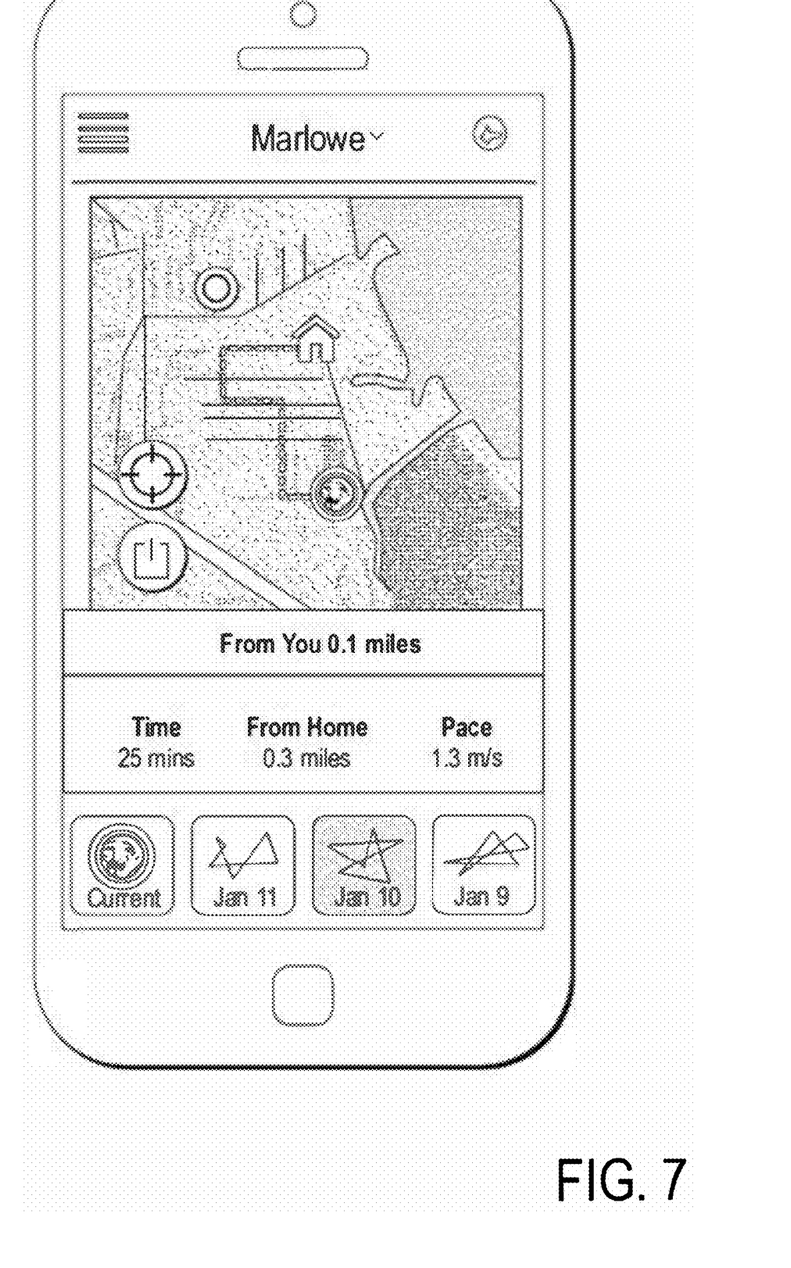
FIG. 7 illustrates another embodiment of a graphical user interface provided on a mobile computing device in one embodiment of the system.

The pet tracker 500 of some embodiments additionally includes a GPS antenna 548 that is wirelessly connectable to a GPS satellite and configured to identify a location of the pet. As with other embodiments, such information may be transmitted to the mobile computing device or the server for processing and analysis, and the processed signals may be transmitted or utilized by the mobile computing device to display useful information to a pet owner. In some embodiments, the graphical user interface of the pet owner's mobile computing device is configured to display the current location of a pet and a log of previously detected locations of the pet. If a pet is on the move, a plot of the pet's location over time may be generated. One such plot is shown, as an example, in the graphical user interface of FIG. 7. A log of past travels may also be accessible. A pet owner may use such information to track a history of walks with his or her pet. Such a feature can also be extremely helpful in the event that a pet gets lost or runs away from home. In various embodiments, a user can track a pet's location to facilitate finding the pet. Additionally, in some embodiments, a pet owner can share the location plot with family, friends, neighbors, community members near where the pet was last seen, or others to facilitate a community effort in finding the pet. Moreover, in some embodiments, a pet owner can set up a geo-fence, which is a virtual perimeter for a geographic area. A pet owner may choose to set the geo-fence to match the boundaries of the pet owner's home, yard, or neighborhood, for example. If a pet travels beyond the defined geo-fence boundaries, the mobile computing device may receive a signal and be configured to generate an alert notifying the pet owner.

In various embodiments, some of or all this data detected by the pet tracker 500 is transmitted wirelessly, for example, via a communication antenna 550, to the server for processing, analysis, and storage. The processed data may be automatically pushed to the pet owner's mobile computing device or retrievable by the pet owner via the mobile computing device. The tracked data may be helpful to a pet owner and provide new insights related to caring for the pet. In addition to sharing sensor information with a pet owner, the server of some embodiments also shares such information with an insurance provider for risk and premium adjustment calculations to generate more personalized insurance packages, as described in more detail below.

In some embodiments provided herein, the server 120 is controlled, maintained, or owned by an insurance provider. In such embodiments, all premium calculations, application processing, and claims processing may occur at the server 120. In other embodiments, premium calculations, application processing, and claims processing are performed by a separate insurer computing device 150 in communication with the server 120.

In various embodiments, the server 120, the additional user computing devices 140, and the insurer computing device 150 each includes some of or all the functional components described in relation to the mobile computing device 200 of FIG. 2. For example, each device includes a processor and memory having instructions stored thereon, wherein execution of the instructions by the processor, cause the processor to perform a method, such as methods described elsewhere herein. Moreover, each of the server 120, additional user computing devices 140, and insurer computing device 150 include a network interface for wirelessly receiving and transmitting data, and each computing device may include or be coupled to an input device for receiving user inputs and an output device for conveying information.

In various embodiments provided herein, each of the modules described in reference to FIG. 2, including the records management module 224, the insurance module 226, and the tracking module 228, has both an application-side component residing in the mobile computing device 200 and a server-side component residing on the memory of the server 120.

Figure 8:
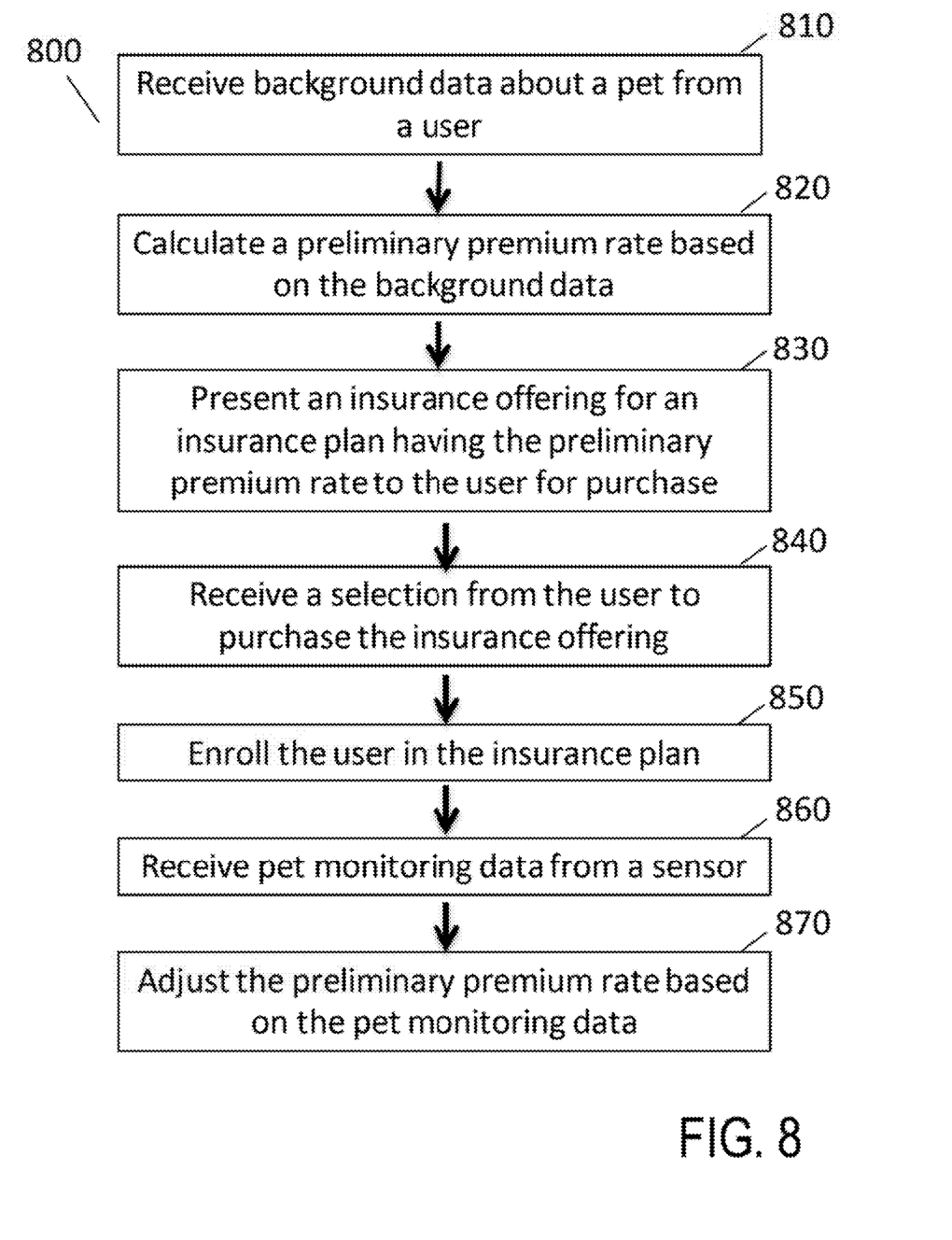
FIG. 8 illustrates a flow chart of one embodiment of a method for rating, offering, enrolling a user in, and adjusting pet insurance.

In some embodiments, the server 120 is configured to perform various methods pertaining to offering, providing, and adjusting insurance. In some such embodiments, as shown in FIG. 8, the server 120 performs method 800. At block 810, the server 120 receives background data about a pet from a pet owner via a user input through the pet owner's mobile computing device. The server 120 calculates a preliminary premium rate based on the background data at block 820. For example, the server 120 may contain an actuarial model used to determine a preliminary premium rate based on information such as the pet's age, breed, relative health status, proportion of time spent outdoors, vaccination record, fixed status, and the like. At block 830, the server 120 of various embodiments transmits an insurance offering, which includes the preliminary premium rate, to the mobile computing device of the pet owner. The pet owner may then select an insurance offering for purchase through the graphical user interface of the mobile computing device. The server 120 is configured to receive, via signals transmitted by the mobile computing device, a selection from the user to purchase an insurance plan associated with the insurance offering, as shown at block 840. In some embodiments, at block 850, the server 120 additionally enrolls the user in the insurance plan. Such a process may involve generating forms or contracts for the pet owner to review, fill out, and/or sign. In a preferred embodiment, all such forms and contracts are transmitted by the server 120 to the mobile computing device and formatted to be reviewed, completed, and signed by the owner through the mobile application.

In some embodiments, the server 120 additionally receives pet monitoring data for the pet from at least one sensor on a pet tracker, as shown at block 860. The pet monitoring data may include any pet monitoring data described above or any other detectable data. The pet monitoring data may be used to verify the accuracy of previously submitted background data and/or supplement the background data. The server 120 of some embodiments is additionally programmed to adjust the preliminary premium rate based on the pet monitoring data, as shown at block 870. The adjustment process is performed by the server 120 by applying an actuarial model, which provides weights to various risk factors and determines a risk level of a pet based, at least in part, on the detected environment and activity of the pet. As non-limiting examples, in some embodiments, a pet may be deemed to be a high risk pet if pet monitoring data indicates that the pet is left outside in extreme cold or hot conditions, is left in a hot car, is inactive, frequently escapes from its home, or resides in a location close to a busy street. Such a pet may have its premium adjusted upwards. Other pets found to be highly active and living in comfortable and safe conditions may have their premiums adjusted downwards.

In some embodiments, the server 120 tracks and correlates data collected from the pet tracker to health outcomes and health care costs for various pets. Over time, the collected data is expected to reveal new, less intuitive correlations between pet environment and activity and health care costs. Such correlations can be added into the actuarial model to further improve the accuracy of its risk assessments. The collected data will also provide additional data to known correlations, allowing the server to adjust the weightings of various risk factors to improve accuracy of its models. In this way, the pet management system of various embodiments may be used to refine and improve pet insurance actuarial models.

In other embodiments, the method of offering, providing, and adjusting insurance is performed by an entity unique from the entity maintaining the server. In such embodiments, the server 120 acts as an intermediary between the insurance provider and the pet owner, and accordingly, between the insurer computing device 150 and the pet owner's mobile computing device 110.

In some such embodiments, the server 120 receives background data about the pet from the pet owner via inputs into the mobile computing device 110. The server 120 also transmits the background data to the insurer computing device 150, enabling the insurer to calculate a preliminary premium rate based on the background data and the insurer's proprietary actuarial models. The server 120 also receives an insurance offering from the insurer computing device 150 and presents the insurance offering to the pet owner for purchase via a user interface. The insurance offering of various embodiments is for an insurance plan having the calculated preliminary premium rate.

In some embodiments, the server 120 may transmit the background data to more than one insurer computing device. In such embodiments, a plurality of insurance providers may compete for business, having the opportunity to each submit an insurance offering and associated preliminary premium rate. In such embodiments, the server 120 receives an individual insurance quote from each of the plurality of insurer computing devices 150. In some embodiments, all insurance offerings may be transmitted to the pet owner's mobile computing device 110 for display to, and selection by, a user. In other embodiments, the server 120 is configured to curate the insurance offerings based, at least in part, on price and the pet owner's insurance preferences. For example, one or a few insurance offerings may be chosen by the server 120, which provide the best balance between low cost and user-preferred insurance features. In other embodiments, the selected offerings may be ones that offer the most robust insurance coverage for the lowest relative cost. In such embodiments, the server 120 transmits one or a limited selection of the insurance offerings to the mobile computing device 110 for display to a user. In some embodiments, the server 120 or an administrator of the server 120 may negotiate with one or more insurers to obtain the best quote for the pet owner.

Figure 9:
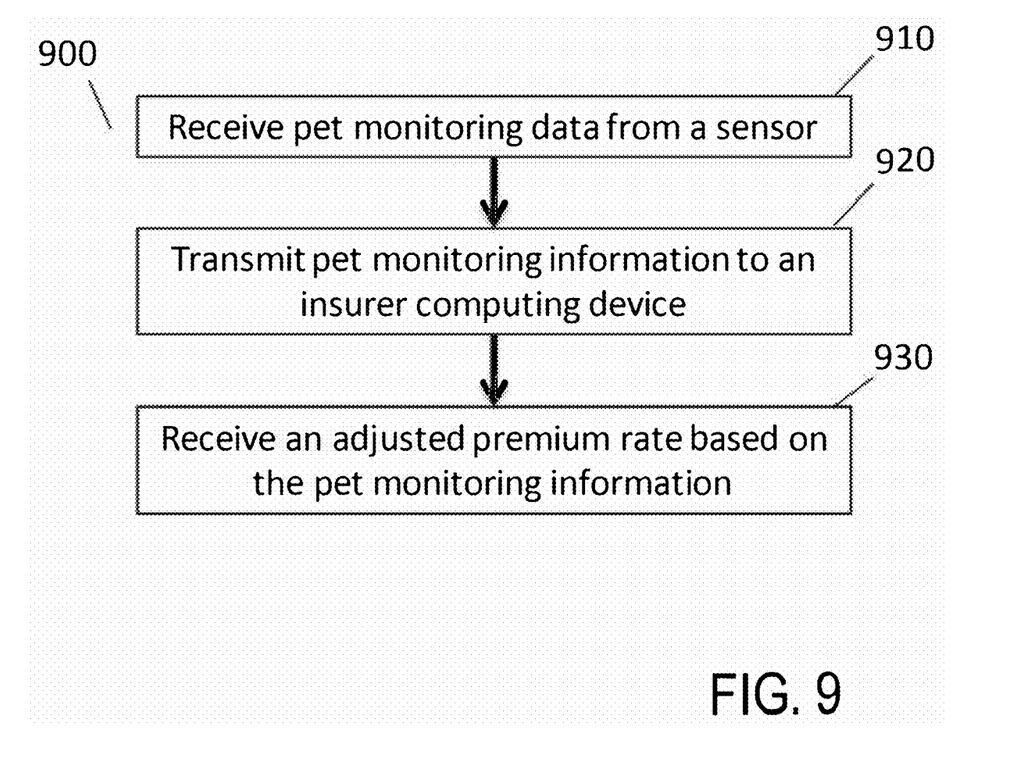
FIG. 9 illustrates a flow chart of one embodiment of a method for personalizing pet insurance.

As shown in FIG. 9, in some embodiments having both a server 120 and an insurer computing device 150, the server 120 performs method 900. At block 910, the server 120 receives pet monitoring data for a pet from at least one sensor on a pet tracker 130. The pet monitoring data may include any of the data discussed above or any additional, detectable data of interest. At block 920, the server 120 of such embodiments transmits pet monitoring information to one or more insurer computing devices 150 associated with one or more insurance providers. The pet monitoring information may include all or a portion of the pet monitoring data. For example, the pet monitoring information may include a stream of all collected pet monitoring data, a stream of one or more parameters of interest, an aggregation of pet monitoring data collected in a given timeframe, an aggregation of pet monitoring data collected from a population of pets, or plots, averages, or other metrics calculated from aggregate data. In some embodiments, the server 120 processes and curates the large quantity of tracked data received from various pet trackers and generates filtered or aggregated data that is of high value to one or more insurance providers. In some embodiments, the server 120 may transmit pet monitoring data associated with a particular pet to the insurance provider of that pet. Additionally or alternatively, the server 120 may transmit de-identified pet monitoring data collected for a particular population of pets over time to one or a plurality of pet insurance providers. The population of pets may be, for example, a population based on pet species, breed, location of residence, fixed status, or any other demographic characteristic of interest. In such embodiments, the insurance providers may use the de-identified pet monitoring data to build and refine their own actuarial models. The insurance providers may adjust a premium rate for a pet based on their modified actuarial models and/or based on the pet monitoring data received for a particular pet. In various embodiments, at block 930, the server 120 receives the adjusted premium rate for the pet from the insurer computing device 150 and transmits the adjusted rate to the pet owner via the mobile computing device 110. In some embodiments, the server 120 automatically adjusts the amount of auto-pay amount a pet owner pays each month to match the adjusted premium rate.

These are just some of the methods and functions performed by the pet management system 100 of the present disclosure. The examples described herein show, by way of illustration and not of limitation, specific embodiments in which the subject matter may be practiced. Other embodiments may be utilized and derived therefrom, such that modifications may be made without departing from the scope of this disclosure. This disclosure is intended to cover any and all adaptations or variations of various embodiments, and it will be readily apparent to those of ordinary skill in the art, in light of the teachings of these embodiments, that numerous changes and modifications may be made without departing from the spirit or scope of the appended claims.

What is claimed is:

1. A method for individualizing pet insurance premiums based on acquired pet monitoring data performed by a server of a computing system, the method comprising:
   receiving pet monitoring data from at least one sensor on a pet monitoring device worn by a pet, wherein the pet monitoring data comprises an activity level received from at least one of a gyroscope or an accelerometer;
   transmitting at least a portion of the pet monitoring data to an insurer computing device;
   receiving background data about the pet via a user input or from the pet monitoring device, wherein the background data comprises at least one of: an age, sex, breed, place of residence, proportion of time spent outdoors, vaccine record, neuter record, preexisting health condition, other medical history, or owner insurance preference;
   transmitting the background data to the insurer computing device, wherein the pet monitoring data is used to verify or supplement the background data received from the user input, and wherein the insurer computing device calculates a preliminary premium rate based on the background data; and
   receiving an adjusted premium rate for the pet from the insurer computing device, wherein the adjusted premium rate is determined by the insurer computing device by adjusting the preliminary premium rate based on the pet monitoring information.

2. The method of claim 1, further comprising:
   presenting an insurance offering to the user for purchase via a user interface, wherein the insurance offering comprises the preliminary premium rate.

3. The method of claim 1, wherein transmitting the background data to the insurer computing device comprises transmitting the background data to a plurality of insurer computing devices, and wherein the method further comprises: receiving an individual insurance quote from each of the plurality of insurer computing devices, and selecting a best quote and corresponding preliminary premium rate to present to the user.

4. The method of claim 3, further comprising negotiating, with an insurer, the best quote on the user's behalf.

5. The method of claim 1, wherein the background data about the pet is manually entered by a user through a graphical user interface on a personal computing device.

6. The method of claim 1, wherein the background data about the pet is automatically pulled from a web-based medical record or an image of a physical medical record.

7. The method of claim 2, further comprising:
transmitting the at least a portion of the pet monitoring data and the background data to an alternative insurer;
receiving an alternative quote from the alternative insurer, wherein the alternative quote is determined based, at least in part, on the at least a portion of the pet monitoring data and the background data;
comparing the adjusted insurance rate and the alternative quote to determine which insurance package is better for the user; and
transferring the user's insurance coverage to the alternative insurer if the alternative quote is better for the user than the adjusted insurance rate.

8. The method of claim 1, wherein the pet monitoring data further comprises one or more of:
extreme temperature event data received from a thermistor or other temperature-responsive sensor;
impact event data received from the accelerometer;
a repetitive motion of the pet, wherein the repetitive motion is selected from a group consisting of: breathing, heart beating, and scratching;
a detected location received from a GPS monitor; or
a combination thereof.

9. The method of claim 1, wherein the at least a portion of the pet monitoring data comprises a compilation of relevant pet monitoring data acquired over a period of time.

10. The method of claim 1, wherein the at least a portion of the pet monitoring data further comprises an analysis of the pet monitoring data.

11. The method of claim 1, further comprising building an actuarial model based on the pet monitoring data.

12. The method of claim 1, wherein the method is repeated periodically to update the adjusted premium rate based on recently acquired pet monitoring data.

13. A method of individualizing pet insurance premiums based on acquired pet monitoring data performed by a server of a computing system, the method comprising:
receiving pet monitoring data from at least one sensor on a pet monitoring device worn by a pet, wherein the pet monitoring data comprises an activity level received from at least one of a gyroscope or an accelerometer;
transmitting at least a portion of the pet monitoring data to an insurer computing device;
receiving background data about the pet that comprises at least one of: an age, sex, breed, place of residence, proportion of time spent outdoors, vaccine record, neuter record, preexisting health condition, other medical history, or owner insurance preference, wherein the background data is received from the pet monitoring device or automatically pulled from a web-based medical record or an image of a physical medical record;
transmitting the background data to the insurer computing device, wherein the pet monitoring data is used to verify or supplement the background data, and wherein the insurer computing device calculates a preliminary premium rate based on the background data; and
receiving an adjusted premium rate for the pet from the insurer computing device, wherein the adjusted premium rate is determined by the insurer computing device by adjusting the preliminary premium rate based on the pet monitoring information.

14. A method of individualizing pet insurance premiums based on acquired pet monitoring data performed by a server of a computing system, the method comprising:
receiving pet monitoring data from at least one sensor on a pet monitoring device worn by a pet, wherein the pet monitoring data comprises an activity level received from at least one of a gyroscope or an accelerometer;
transmitting at least a portion of the pet monitoring data to an insurer computing device;
receiving background data about the pet via a user input or from the pet monitoring device, wherein the background data about the pet comprises at least one of: an age, sex, breed, place of residence, proportion of time spent outdoors, vaccine record, neuter record, preexisting health condition, other medical history, or owner insurance preference;
transmitting the background data to the insurer computing device, wherein the pet monitoring data is used to verify or supplement the background data received from the user input, and wherein the insurer computing device calculates a preliminary premium rate based on the background data;
receiving an adjusted premium rate for the pet from the insurer computing device, wherein the adjusted premium rate is determined by the insurer computing device by adjusting the preliminary premium rate based on the pet monitoring information; and
adjusting an auto-pay amount associated with the preliminary premium rate to correspond to the adjusted premium.

15. The method of claim 14, wherein the pet monitoring data further comprises extreme temperature event data, and wherein the extreme temperature event data is received from a thermistor or other temperature-responsive sensor.

16. The method of claim 14, wherein the pet monitoring data further comprises impact event data, and wherein the impact event data is received from the accelerometer.

17. The method of claim 14, further comprising building an actuarial model based on the pet monitoring data.

18. The method of claim 14, wherein the pet monitoring data further comprises a detected location received from a GPS monitor.

19. The method of claim 14, wherein the background data about the pet is manually entered by a user through a graphical user interface on a personal computing device.

20. The method of claim 14, wherein the background data about the pet is automatically pulled from a web-based medical record or an image of a physical medical record.

* * * * *